US008256831B2

(12) United States Patent
Abe et al.

(10) Patent No.: US 8,256,831 B2
(45) Date of Patent: Sep. 4, 2012

(54) STRUCTURE FOR VEHICLE BODY FRONT PORTION

(75) Inventors: Ryota Abe, Wako (JP); Kojiro Okabe, Wako (JP); Shinichi Yoshikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/062,249

(22) PCT Filed: Sep. 11, 2009

(86) PCT No.: PCT/JP2009/065935
§ 371 (c)(1),
(2), (4) Date: Mar. 4, 2011

(87) PCT Pub. No.: WO2010/038598
PCT Pub. Date: Apr. 8, 2010

(65) Prior Publication Data
US 2011/0148151 A1 Jun. 23, 2011

(30) Foreign Application Priority Data

Oct. 2, 2008 (JP) ................................. 2008-257640
Oct. 2, 2008 (JP) ................................. 2008-257678
Oct. 2, 2008 (JP) ................................. 2008-257761

(51) Int. Cl.
*B62D 25/08* (2006.01)
(52) U.S. Cl. .................. 296/203.02; 296/133; 296/155
(58) Field of Classification Search ............. 296/203.01, 296/203.02, 193.09
See application file for complete search history.

(56) References Cited

U.S. PATENT DOCUMENTS

| 6,886,873 | B2 * | 5/2005 | Weykamp et al. ............. 293/133 |
| 7,459,956 | B2 * | 12/2008 | Chung et al. ................... 327/525 |
| 7,469,956 | B2 * | 12/2008 | Yasuhara et al. ......... 296/187.09 |
| 7,651,155 | B2 * | 1/2010 | Tan et al. .................. 296/187.03 |
| 7,896,411 | B2 * | 3/2011 | Kano et al. .................... 293/133 |
| 2007/0176443 | A1 | 8/2007 | Yasuhara et al. |

FOREIGN PATENT DOCUMENTS

| JP | 07-277110 | 10/1995 |
| JP | 10-310006 | 11/1998 |
| JP | 11-268863 | 10/1999 |
| JP | 2000-238591 | 9/2000 |
| JP | 2005-178682 | 7/2005 |
| JP | 2006-056471 | 3/2006 |
| JP | 2006-088952 | 4/2006 |
| JP | 2006-123887 | 5/2006 |
| JP | 2006-347265 | 12/2006 |
| JP | 2007-190964 | 8/2007 |
| WO | 2009072450 | 6/2009 |

* cited by examiner

*Primary Examiner* — Dennis Pedder
(74) *Attorney, Agent, or Firm* — Rankin, Hill & Clark LLP

(57) ABSTRACT

A vehicle body front structure is disclosed, wherein a large engine can be installed even if the entire vehicle body length is kept compact, and an impact load can be efficiently absorbed. In a vehicle body front structure (10), internal and external extension members (41, 42) protruding forward are provided to the front ends of left and right front side frames (11, 12) and the front ends of left and right upper members (13, 14) via a mounting plate (35). In the mounting plate, internal mounting parts (51) and front walls (68) of the internal extension members are inclined farther toward the front of the vehicle body nearer the center of the vehicle width direction.

9 Claims, 12 Drawing Sheets

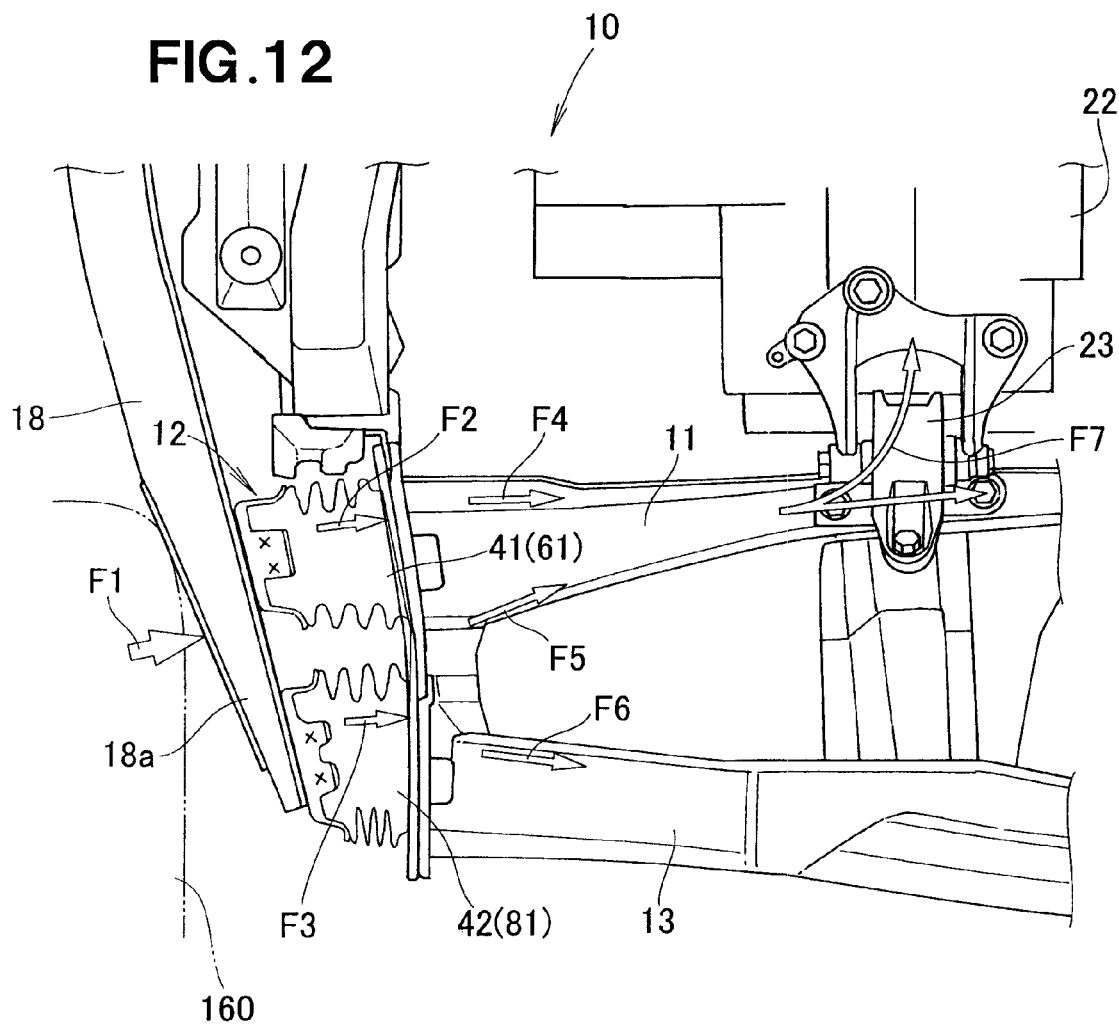

STRUCTURE FOR VEHICLE BODY FRONT PORTION

TECHNICAL FIELD

The present invention relates to a vehicle body front structure wherein internal and external extension members protrude toward the front of a vehicle body from the front ends of front side frames and upper members.

BACKGROUND ART

Vehicle body front structures include those in which upper members are provided to the vehicle-widthwise external sides of front side frames, internal and external impact absorbers (hereinbelow referred to as "extension members") are provided to the front ends thereof and separated from each other in the vehicle width direction, and a bumper beam is provided to the front ends of the internal and external extension members (e.g., Patent Document 1).

In the vehicle body front structure of Patent Document 1 A, a mounting plate spans the space between the front ends of the front side frames and the upper members, and internal and external extension members are provided to the mounting plate.

The internal extension members protrude toward the front of the vehicle body from the front ends of the front side frames. The external extension members protrude toward the front of the vehicle body from the front ends of the upper members. Mount holes are formed in the front ends of both the internal and external extension members, and the bumper beam is mounted by bolts inserted through the mount holes.

According to this vehicle body front structure, when an impact load acts on the bumper beam from the front of the vehicle body, the acting impact load causes the internal and external extension members to deform (collapse), and the impact load is absorbed. Furthermore, the impact load distributed to the internal and external extension members is borne by the front side frames and the upper members. Accordingly, when an impact load acts on the bumper beam from the front of the vehicle body, it is preferable that the impact load be efficiently distributed to the internal extension members and the external extension members, the impact load distributed to the internal extension members be further efficiently distributed to the front side frames, and the impact load distributed to the external extension members be efficiently distributed to the upper members.

Prior Art Literature

Patent Document
    Patent Document 1: Japanese Patent Application Laid-Open Publication No. 2007-190964 A

SUMMARY OF INVENTION

Technical Problem

It is an object of the present invention to provide a vehicle body front structure whereby a large engine can be installed and the impact load absorbed in a vehicle whose entire vehicle body length is kept compact.

Solution to Problem

According to a first aspect of the present invention, there is provided a vehicle body front structure which comprises: left and right front side frames extending longitudinally of a vehicle body; left and right upper members disposed on respective external sides of the left and right front side frames and extending in an upward slope toward the rear of the vehicle body; mounting plates mounted on front ends of the left and right front side frames and front ends of the left and right upper members; left and right internal extension members provided to the mounting plates near to a vehicle widthwise center; and left and right external extension members provided to the mounting plates so as to be outside of the internal extension members, wherein the left and right internal extension members protrude toward the front of the vehicle body from the front ends of the left and right front side frames while the left and right external extension members protrude toward the front of the vehicle body from the front ends of the left and right upper members, the mounting plates to which the internal extension members are provided have internal mounting parts inclined farther to the front of the vehicle body near the vehicle widthwise center, and the internal extension members have front walls inclined farther to the front of the vehicle body near the vehicle widthwise center.

Preferably, the vehicle body front structure further comprises a front bulkhead for supporting a cooling member. The front bulkhead may be disposed internally of the mounting plates near the vehicle widthwise center and has stays forming sides thereof, rear flanges are formed at rear parts of the stays so as to protrude toward the mounting plates. The rear flanges may be mounted on the mounting plates.

It is preferred that the internal extension members have tubes formed by top walls, bottom walls, internal walls and external walls, and front lids for closing off front ends of the tubes, the front lids have top-wall securing flaps, bottom-wall securing flaps, internal-wall securing flaps and external-wall securing flaps capable of being welded so as to correspond respectively to the top walls, the bottom walls, the internal walls and the external walls, and the top-wall securing flaps, the bottom-wall securing flaps, the internal-wall securing flaps and the external-wall securing flaps have respective flap end edges which are separated from the mounting plates by a same distance.

Desirably, the vehicle body front structure further comprises a front bulkhead for supporting a cooling member. The front bulkhead may be disposed internally of the mounting plates near the vehicle widthwise center, and the front bulkhead is provided to the mounting plate.

It is preferred that the tubes have internal plates having the internal walls and top and bottom curved areas fashioned into U shapes in cross section and external plates having the external walls and top and bottom curved areas fashioned into U shapes in cross section, the top curved areas of the internal and external plates be superposed together to form the top walls while the bottom curved areas of the internal and external plates are superposed together to form the bottom walls, and the internal walls and the external walls have reinforcing beads formed so as to extend longitudinally of the vehicle body.

It is preferred that the internal extension members have internal plates having top and bottom curved areas fashioned into U shapes in cross section, and external plates having top and bottom curved areas fashioned into U shapes in cross section, the top curved areas of the internal plates and the external plates be superposed and welded together to form top walls of the extension members, the bottom curved areas of the internal plates and the external plates be superposed and welded together to form bottom walls of the extension members, and top joining parts on which the top curved areas are welded, bottom joining parts on which the bottom areas are welded, and fastening members for fastening the front ends of the extension members to the bumper beam be positioned along load transmission lines of an impact load acting from the front of the vehicle body.

The load transmission lines are offset from the vehicle widthwise centers of the extension members toward either the internal plates or the external plates, and the one set of plates on the sides to which the load transmission lines are offset are designed to be thicker than the other set of plates.

Preferably, the one set of plates is provided near the front side frames by designing the internal plates as the one set of plates, and the other set of plates is provided near the upper members by designing the external plates as the other set of plates.

In a preferred form, the left and right front side frames have a space for allowing the placement of a power source, and the power source is provided to the left and right front side frames.

Advantageous Effects of the Invention

In the present invention, a mounting plate is provided to the front ends of the front side frames and the upper members. Internal mounting parts, where the internal extension members are provided to the mounting plate, are made to be inclined toward the front of the vehicle body. Accordingly, it is possible to extend the front ends of the front side frames toward the front of the vehicle body, and to move the front bulkhead provided to the front ends of the front side frames toward the front of the vehicle body. The radiator or other cooling member supported on the front bulkhead can thereby be moved toward the front of the vehicle body. Therefore, a large engine compartment can be ensured toward the front of the vehicle body and a large engine can be installed in a vehicle whose entire vehicle body length is kept compact.

Furthermore, the internal mounting parts of the mounting plate are made to incline farther toward the front of the vehicle body as they approach the vehicle widthwise center, and the front walls of the internal extension members are made to incline farther toward the front of the vehicle body as they approach the vehicle widthwise center. Accordingly, in the internal extension members, the internal walls near the vehicle widthwise center and the external walls near the vehicle-widthwise exterior can be made to protrude in substantially the same amount. The entire internal extension members can thereby be made to deform (collapse) evenly in cases in which an impact load acts on the internal extension members. Therefore, it is possible to ensure that the internal extension members will absorb a sufficient amount of the impact load.

In the present invention, the front bulkhead is disposed near the vehicle widthwise center of the mounting plate. Rear flanges are made to protrude toward the mounting plate in the rear parts of the stays of the front bulkhead, and the rear flanges are provided to the mounting plate. The front bulkhead, i.e., the radiator or other cooling device, can thereby be moved further toward the front of the vehicle body, and an even larger engine compartment can be ensured toward the front of the vehicle body in a vehicle whose entire vehicle body length is kept compact.

Furthermore, in the present invention, front lids for closing off the front ends of the tubes are provided to the extension members. The front lids are provided with top-wall securing flaps, bottom-wall securing flaps, internal-wall securing flaps, and external-wall securing flaps capable of being welded respectively to the top walls, the bottom walls, the internal walls, and the external walls. The respective flap end edges of the securing flaps are separated from the mounting plate by the same distance. An even amount of deformation (collapse) can thereby be ensured in the extension members, and the impact load can be satisfactorily absorbed.

Furthermore, in the present invention, two top curved areas of the internal and external plates are superposed together, forming the top walls of the tubes, and two bottom curved areas of the internal and external plates are superposed together, forming the bottom walls of the tubes. Furthermore, reinforcing beads extending in the longitudinal direction of the vehicle body are formed in the internal walls and external walls of the tubes. Therefore, the rigidity of the internal walls and external walls can be adapted to the top walls and bottom walls. Thus, by designing the internal walls, the external walls, the top walls, and the bottom walls to have substantially the same rigidity, an even amount of deformation (collapse) can be ensured in the extension members, and the impact load can be satisfactorily absorbed.

In the present invention, the bumper beam is fastened to the front ends of the internal extension members by fastening members. The two top curved areas of the internal and external plates are welded and superposed together, forming the top walls of the internal extension members. Furthermore, the two bottom curved areas of the internal and external plates are welded and superposed together, forming the bottom walls of the internal extension members. The top joining parts where the two top curved areas are welded, the bottom joining parts where the two bottom curved areas are welded, and the fastening members are disposed along load transmission lines of the impact load applied to the bumper beam from the front of the vehicle body. Accordingly, when an impact load acts on the bumper beam, the acting impact load is distributed to the internal and external extension members via the fastening members. The impact load distributed to the internal and external extension members is distributed to the front side frames via the joining parts of the top curved areas and bottom curved areas. Thus, the impact load acting on the bumper beam is transmitted to the front side frames via the fastening members, the top joining parts of the top curved areas, and the bottom joining parts of the bottom curved areas, whereby the impact load can be efficiently transmitted to the front side frames.

Furthermore, in the present invention, the load transmission lines are offset to one side of the internal plates and external plates, and one set of plates is designed to be thicker than the other set of plates. Accordingly, even if an impact load is distributed unevenly to one set of plates, the entire extension members can be made to deform (collapse) evenly. It is thereby possible to ensure that the extension members will absorb a sufficient amount of the impact load.

Furthermore, in the present invention, the one set of plates that is thicker than the other set of plates is provided to the front side frames. The other set of plates that is thinner than the one set of plates is provided to the upper members. Accordingly, a comparatively large impact load can be distributed via the one set of plates to the front side frames, which have higher rigidity than the upper members. A comparatively small impact load can be distributed via the other set of plates to the upper members, which have lower rigidity than the front side frames. It is thereby possible to cause the entire extension members to deform (collapse) evenly, and to ensure that the extension members will absorb a sufficient amount of the impact load.

Furthermore, in the present invention, a power source is provided (suspended) on the left and right front side frames. Accordingly, the impact load distributed to one of the left and right front side frames can be dispersed via the power source to the other front side frame. The impact load distributed to one front side frame can thereby be borne more satisfactorily.

BRIEF DESCRIPTION OF DRAWINGS

FIG. 12 is a view showing an example in which an impact load is borne by the vehicle body front structure according to the embodiment of the present invention.

DESCRIPTION OF EMBODIMENTS

Certain preferred embodiments of the present invention will be described in detail below with reference to the attached drawings.

Figure 1:
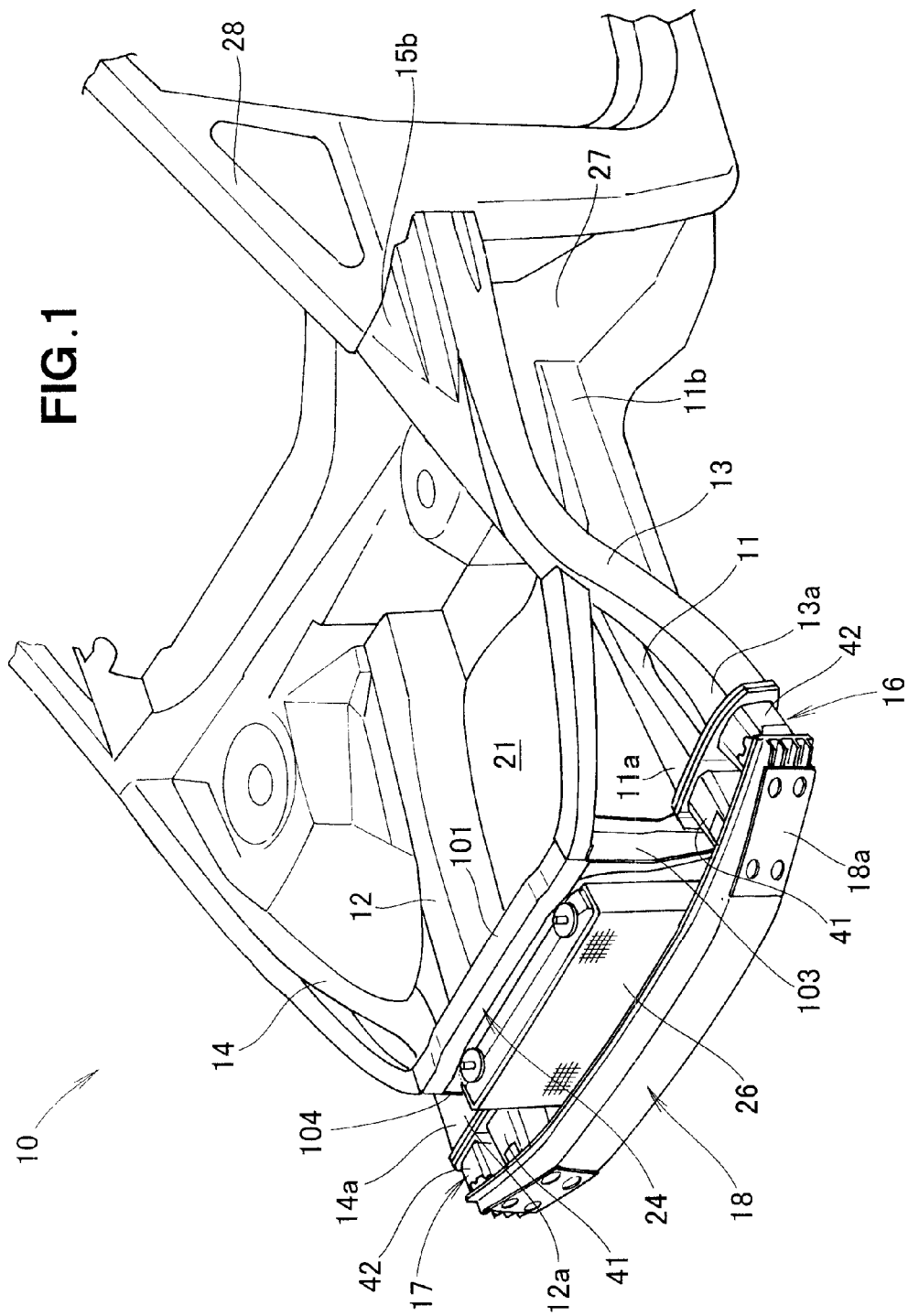
FIG. 1 is a perspective view showing a vehicle body front structure according to an embodiment of the present invention.

In FIG. 1, a vehicle body front structure 10 comprises left and right front side frames 11, 12 on the left and right sides of the front of the vehicle body. A left upper member 13 is provided on the outer side of the left front side frame 11 with respect to the vehicle width direction. A right upper member 14 is provided on the outer side of the right front side frame 12 with respect to the vehicle width direction. A left impact-absorbing unit 16 is provided to the front end 11a of the left front side frame 11 and the front end 13a of the left upper member 13. A right impact-absorbing unit 17 is provided to the front end 12a of the right front side frame 12 and the front end 14a of the right upper member 14. A bumper beam 18 extends between the left and right impact-absorbing units 16, 17.

Furthermore, the vehicle body front structure 10 comprises a power source 22 (see FIGS. 2 and 3) in a space (engine compartment) 21 between the left and right side frames 11, 12, a front bulkhead 24 in front of the power source 22, and a radiator or another cooling member 26 on the front bulkhead 24.

Figure 2:
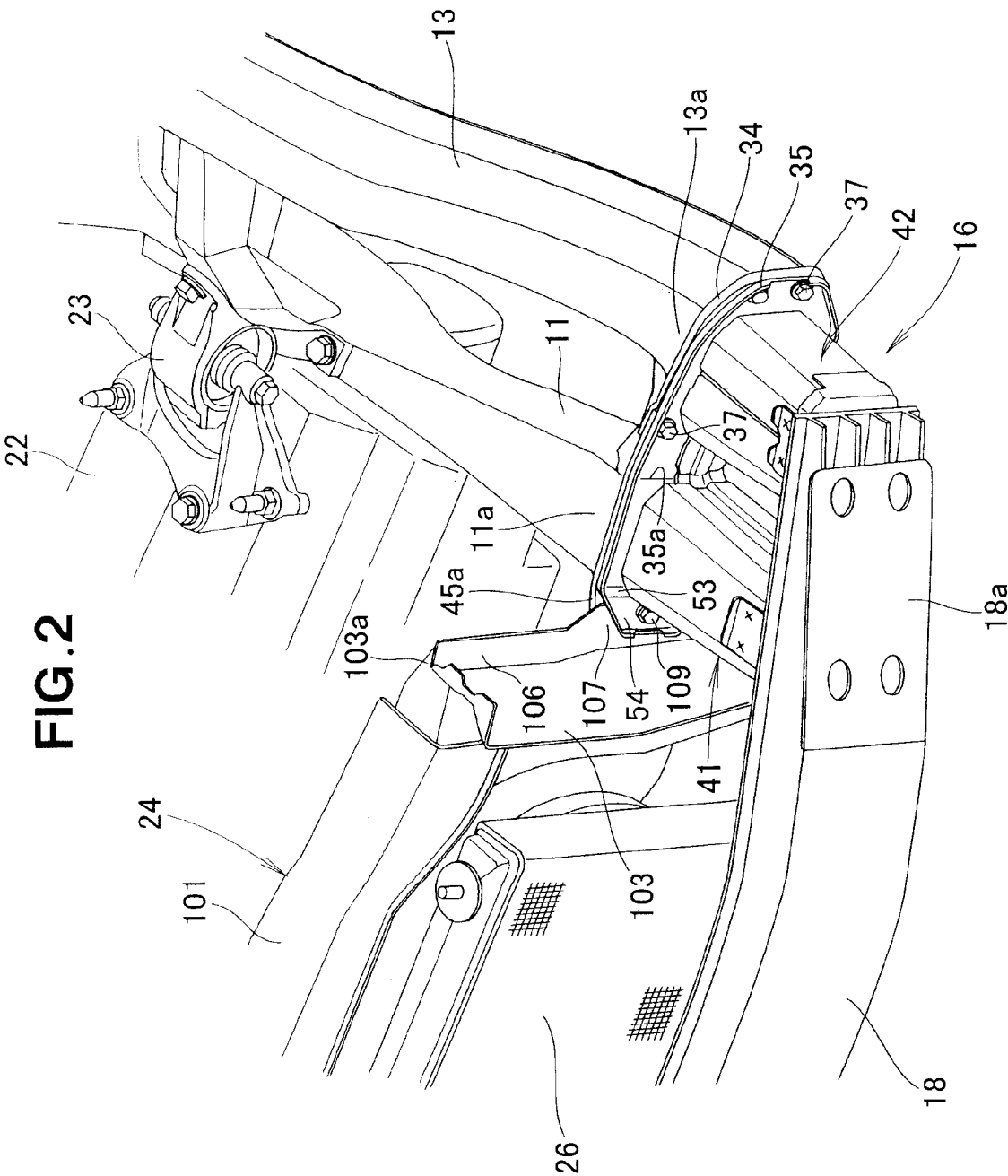
FIG. 2 is a perspective view showing on an enlarged scale the impact-absorbing unit of FIG. 1 and its peripheral structure.
Figure 3:
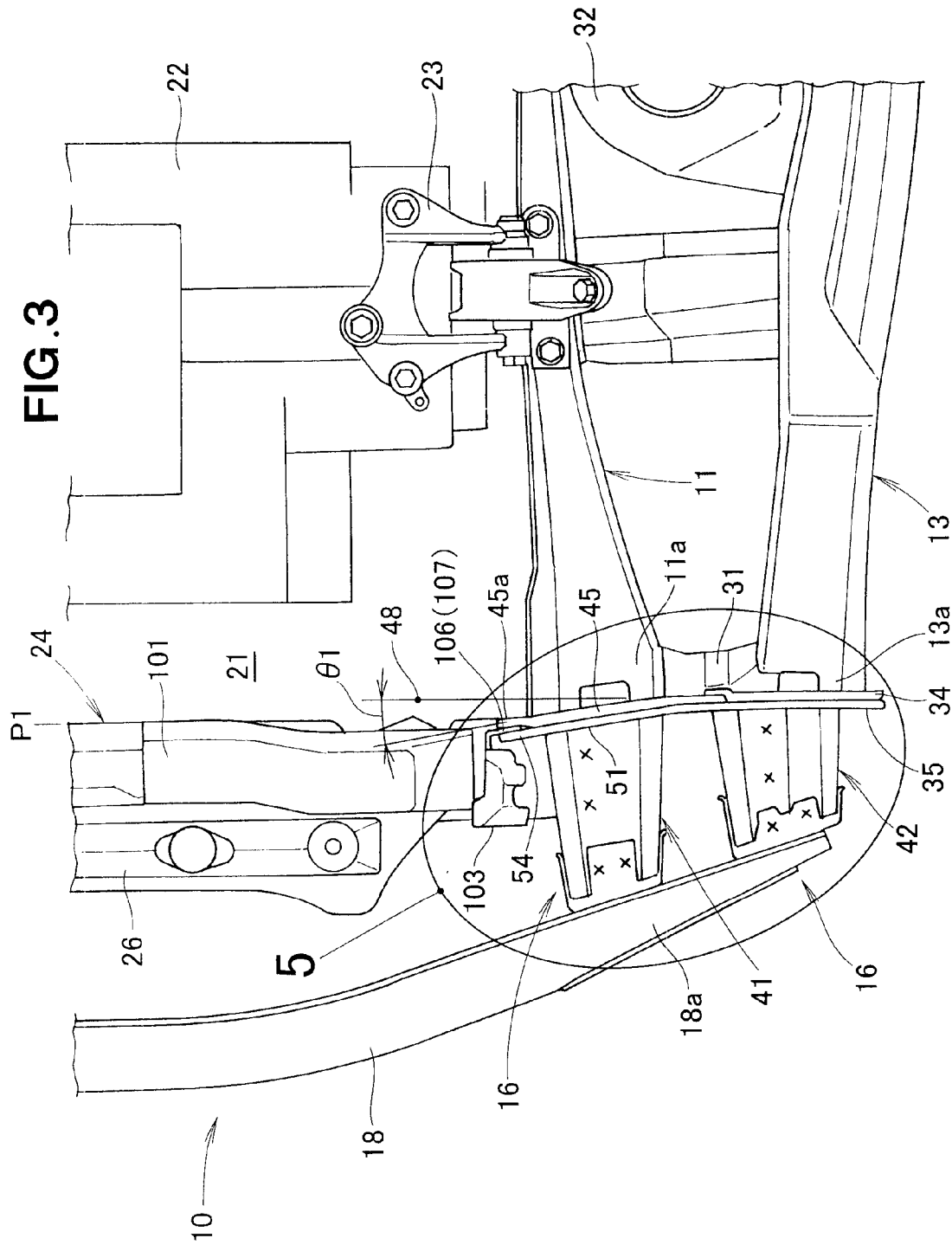
FIG. 3 is a top plan view showing the vehicle body front structure of FIG. 2.

In FIGS. 2 and 3, the power source 22 is a unit made by integrally assembling an engine and a transmission in one example, wherein the engine is disposed on the side of the right front side frame 12 (FIG. 1), and the transmission is disposed on the side of the left front side frame 11. The transmission of the power source 22 is mounted on the left front side frame 11 via a left mounting member 23, and the engine is mounted on the right front side frame 12 via a right mounting member (not shown).

The left front side frame 11 extends in the longitudinal direction of the vehicle body. A rear end 11b (FIG. 1) of the left front side frame 11 is linked to a left outrigger 27 (FIG. 1).

The left upper member 13 is provided on the outside of the left front side frame 11 in the vehicle width direction and is made to extend in an upward slope toward the rear of the vehicle body. A rear end 15b of the left upper member 13 is linked to a left front pillar 28 (FIG. 1).

The front end 11a of the left front side frame 11 is linked in a front linking area 31 formed in the front end 13a of the left upper member 13. A left wheel housing 32 that covers a left front wheel (not shown) is provided between the left front side frame 11 and the left upper member 13.

The left and right front side frames 11, 12 and the left and right upper members 13, 14 are bilaterally symmetrical members, and the left front side frame 11 and left upper member 13 are described hereinbelow while the right front side frame 12 and the right upper member 14 are not described. The left and right impact-absorbing units 16, 17 are bilaterally symmetrical members, and the left impact-absorbing unit 16 is described hereinbelow while the right impact-absorbing unit 17 is not described.

Figure 4:
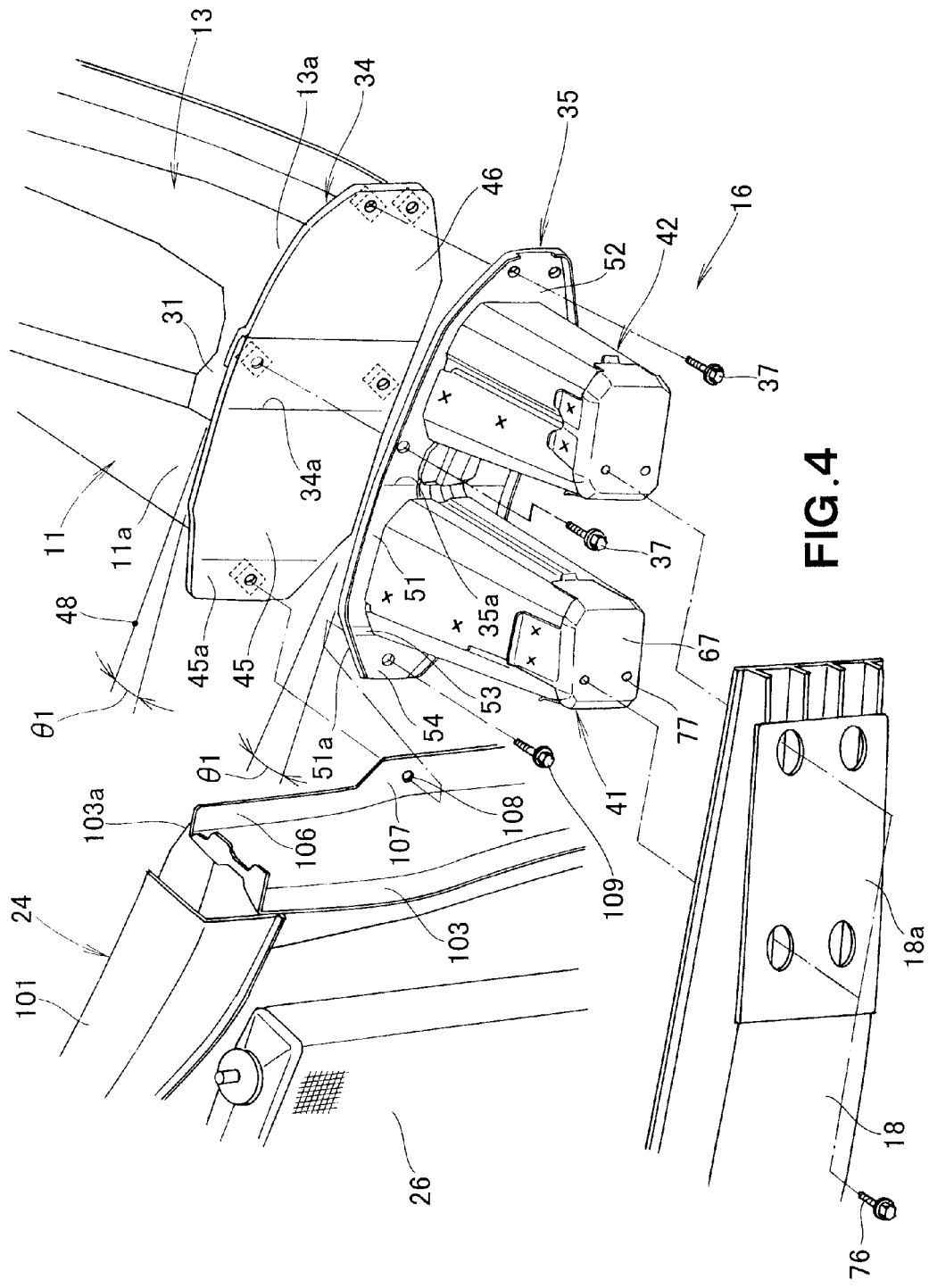
FIG. 4 is an exploded view of the vehicle body front structure of FIG. 2.
Figure 5:
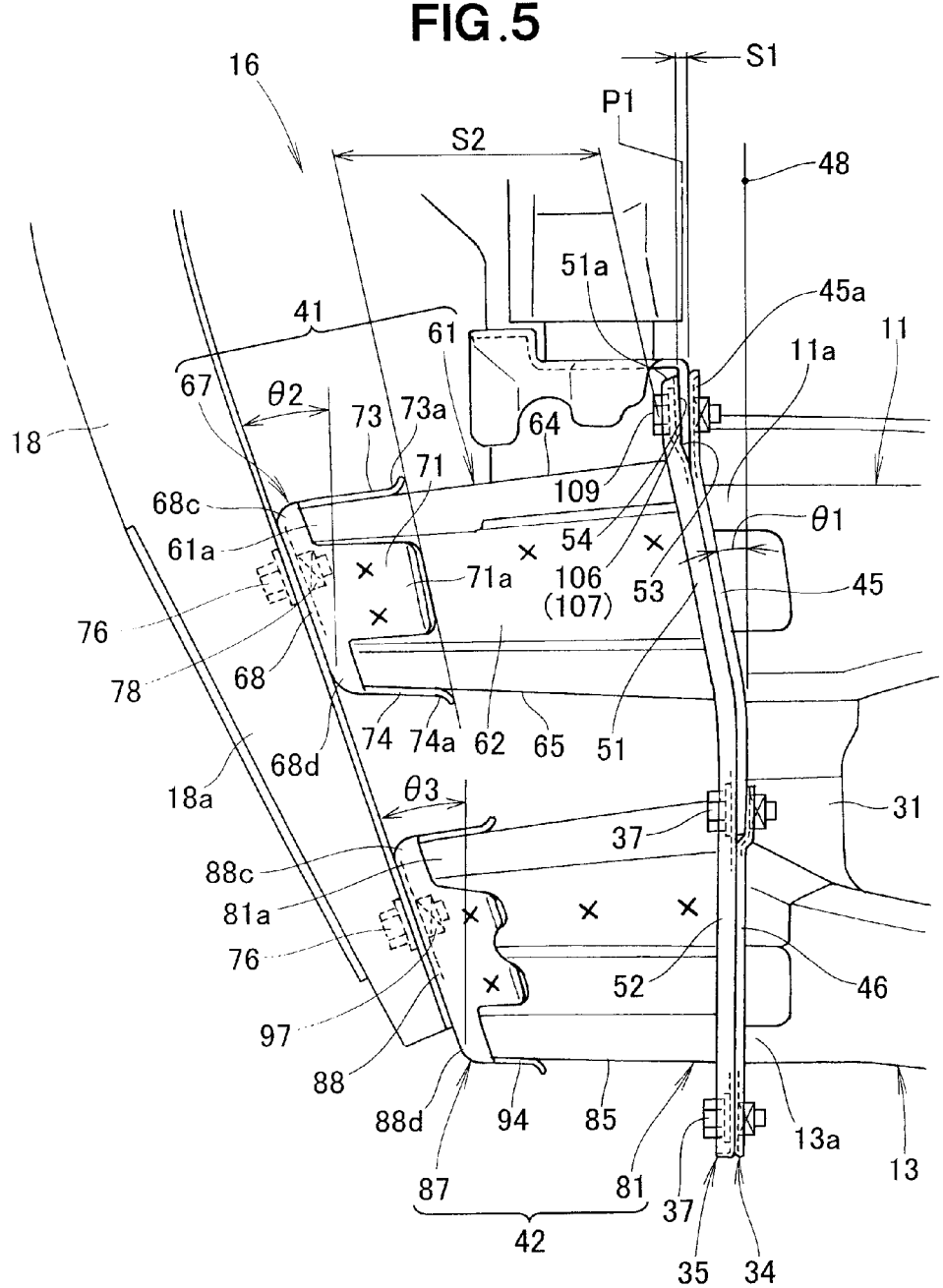
FIG. 5 an enlarged view of section 5 of FIG. 3.
Figure 6:
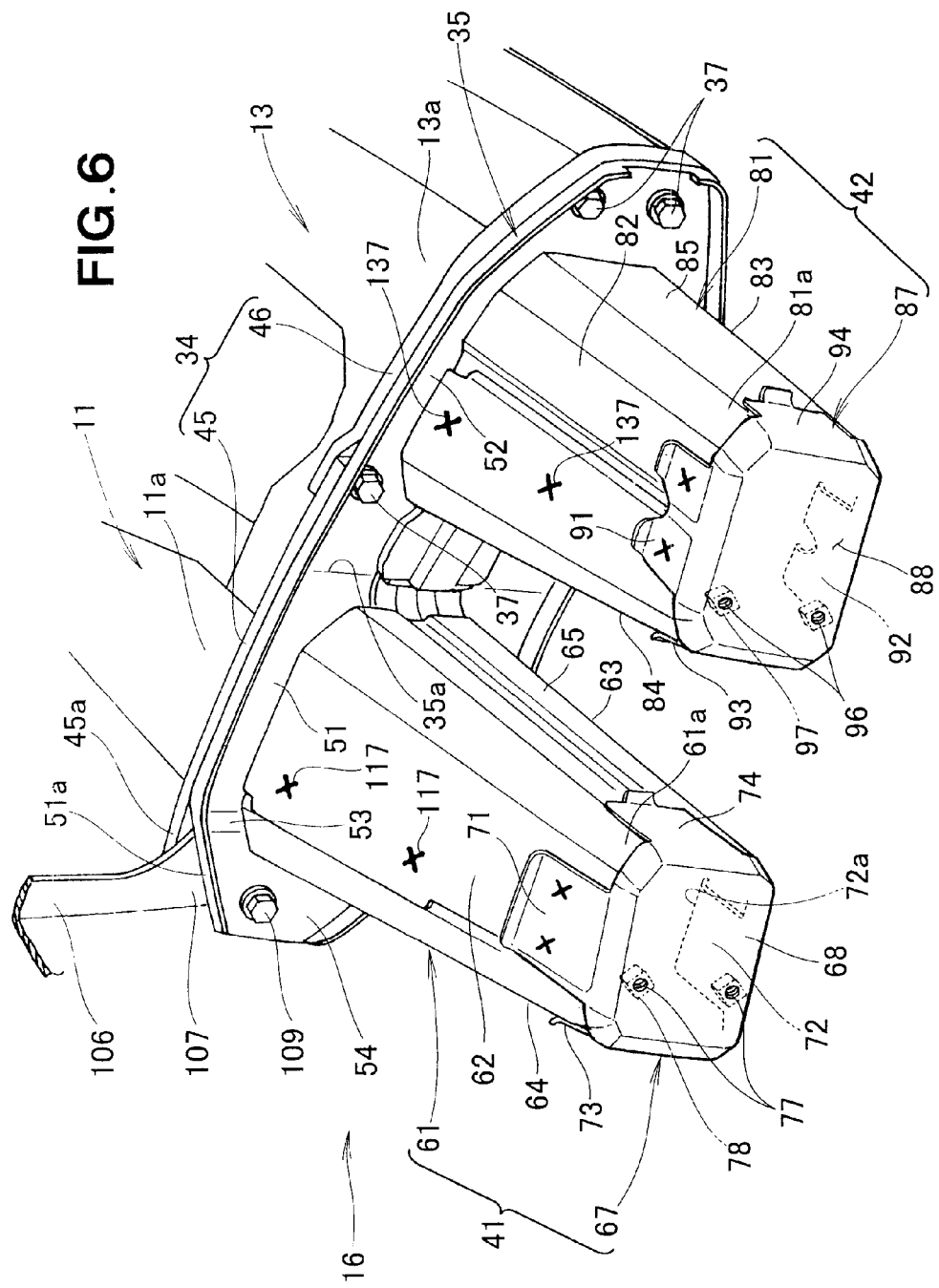
FIG. 6 is an enlarged perspective view showing the left impact-absorbing unit of FIG. 2.

The left impact-absorbing unit 16 has a support plate 34 provided extending from the front end 11a of the left front side frame 11 to the front end 13a of the left upper member 13, a mounting plate 35 mounted on the support plate 34, and an internal extension member 41 and external extension member 42 provided to the mounting plate 35, as shown in FIGS. 4 and 5.

The internal extension member 41 extends from the front end 11a (specifically, the mounting plate 35) of the left front side frame 11 toward the front of the vehicle body, and the external extension member 42 extends from the front end 13a (specifically, the mounting plate 35) of the left upper member 13 toward the front of the vehicle body.

The support plate 34 is formed into a substantially rectangular outward shape, and is provided to the front end 11a of the left front side frame 11, the front end 13a of the left upper member 13, and the front linking area 31. The support plate 34 has an internal support 45 provided to the front end 11a of the left front side frame 11 and an external support 46 provided to the front end 13a of the left upper member 13.

The external support 46 is provided to be substantially parallel to a vehicle width direction line 48 extending in the vehicle width direction. The internal support 45 is slanted forward so as to be inclined from the center 34a of the support plate 34 toward the front of the vehicle body. Specifically, the internal support 45 is slanted forward so as to be inclined toward the front of the vehicle body at an inclination angle θ1 in relation to the vehicle width direction line 48. An internal end 45a of the internal support 45 protrudes toward the widthwise center of the vehicle so as to be substantially parallel to the vehicle width direction line 48.

The mounting plate 35 is mounted by a plurality of bolts 37, 109 to the front surface of the support plate 34, whereby the mounting plate 35 is superposed over the front surface of the support plate 34. The mounting plate 35 is a plate formed into substantially the same outward shape (i.e., a substantial rectangle) as the support plate 34.

The mounting plate 35 is provided so as to extend from the front end 11a of the left front side frame 11 to the front end 13a of the left upper member 13, with the support plate 34 located in between the mounting plate 35 and the front ends. The mounting plate 35 has an internal mounting part 51 provided to the front surface of the internal support 45, and an external mounting part 52 provided to the front surface of the external support 46.

The external mounting part 52 is substantially parallel to the vehicle width direction line 48, similar to the external support 46. The internal mounting part 51 is slanted forward so as to be inclined from the center 35a of the mounting plate 35 toward the front of the vehicle body, similar to the internal support 45. Specifically, the internal mounting part 51 is slanted forward so as to be inclined at an inclination angle θ1 in relation to the vehicle width direction line 48. Furthermore, the internal mounting part 51 has a ridge 53 provided to the internal end 51a and a support piece 54 provided to the ridge 53.

The ridge 53 is an area curved toward the front of the vehicle body in the internal end 51a of the internal mounting part 51. The support piece 54 protrudes from the front of the ridge 53 toward the widthwise center of the vehicle so as to be substantially parallel to the internal end 45a of the internal support 45.

The ridge 53 and the support piece 54 are formed on the internal end 51a, whereby the support piece 54 is disposed at a predetermined distance S1 from the internal end 45a of the internal support 45. Accordingly, a gap for supporting a mounting piece 107 of a rear flange 106 (described hereinafter) can be ensured between the support piece 54 and the internal end 45a. The reasons for supporting the mounting piece 107 of the rear flange 106 between the support piece 54 and the internal end 45a will be described in detail hereinafter.

In FIGS. 6, 7, 8, and 9, the internal extension member 41 and the external extension member 42 are both provided to the mounting plate 35. The internal extension member 41 has an internal tube 61 formed into a substantially rectangular tube shaped from a top wall 62, a bottom wall 63, an internal wall 64, and an external wall 65, and also has and a internal front lid (front lid) 67 for closing off the front end 61a of the internal tube 61. The internal wall 64 is a wall provided facing the widthwise center of the vehicle. The external wall 65 is a wall provided facing outward in the vehicle width direction (i.e., facing the external extension member 42).

In the internal tube 61, the top wall 62 and the bottom wall 63 protrude substantially horizontally toward the front of the vehicle body in a side view. The internal wall 64 and the external wall 65 protrude so as to gradually taper toward the front of the vehicle body in a plan view.

The internal tube 61 has an internal plate 111 provided facing the widthwise center of the vehicle, and an external plate 112 provided facing outward in the vehicle width direction. The internal plate 111 is curved into a substantial U shape in cross section, thereby having the internal wall 64, a top curved area 113, and a bottom curved area 114 (see FIG. 8). The external plate 112 is curved into a substantial U shape in cross section, thereby having the external wall 65, a top curved area 115, and a bottom curved area 116 (see FIG. 8).

The top curved area 113 of the internal plate 111 and the top curved area 115 of the external plate 112 are superposed together, and the top curved areas 113, 115 are spot welded at a plurality of top joining parts 117, thereby forming the top wall 62 of the internal tube 61. The bottom curved area 114 of the internal plate 111 and the bottom curved area 116 of the external plate 112 are superposed together, and the bottom curved areas 114, 116 are spot welded at a plurality of bottom joining parts 118, thereby forming the bottom wall 63 of the internal tube 61.

Thus, the top curved areas 113, 115 are joined together and the bottom curved areas 114, 116 are joined together, whereby the internal tube 61 is formed from the internal plate 111 and the external plate 112.

By overlaying and joining together the top curved areas 113, 115, the rigidity of the top wall 62 is made greater than the rigidity of a wall formed from a single plate. By overlaying and joining together the bottom curved areas 114, 116, the rigidity of the bottom wall 63 is made greater than the rigidity of a wall formed from a single plate.

In the internal tube 61, a reinforcing inner bead 121 extends in the internal wall 64 in the longitudinal direction of the vehicle body. The inner bead 121 is a concavity (groove) extending parallel to the longitudinal direction of the vehicle body in the vertical center of the internal wall 64. The groove bottom of the inner bead 121 is formed at an upward slope so that the inner bead gradually decreases in bead depth toward the front of the vehicle body.

A reinforcing outer bead 122 extends in the longitudinal direction of the vehicle body in the external wall 65. The outer bead 122 is a concavity (groove) extending parallel to the longitudinal direction of the vehicle body in the vertical center of the external wall 65, similar to the inner bead 121. The groove bottom of the outer bead 122 is formed at an upward slope so that the outer bead 122 gradually decreases in bead depth toward the front of the vehicle body.

The inner bead 121 extends in the internal wall 64 and the outer bead 122 extends in the external wall 65, whereby the rigidity of the internal wall 64 and external wall 65 can be increased in accordance with the top wall 62 and the bottom wall 63. The rigidity levels of the four walls: the internal wall 64, the external wall 65, the top wall 62, and the bottom wall 63, can be balanced; a uniform amount of deformation (collapse) in the internal tube 61 (i.e., in the internal extension member 41) can be ensured; and the impact load can be satisfactorily absorbed.

The internal front lid 67 has a front wall (the front end of the internal extension member 41) 68 for closing off the front end front end 61a of the internal tube 61, and also has a top-wall securing flap 71, a bottom-wall securing flap 72, an internal-wall securing flap 73, and an external-wall securing flap 74, which all protrude toward the rear of the vehicle body from the front wall 68.

The top-wall securing flap 71 protrudes from a top end 68a (FIG. 9) of the front wall 68 along the top wall 62 toward the rear of the vehicle body. The top-wall securing flap 71 is secured to the top wall 62 by being spot welded to the top wall 62 at a plurality of top flap joining parts 124, 124.

The bottom-wall securing flap 72 protrudes from a bottom end 68b (FIG. 9) of the front wall 68 along the bottom wall 63 toward the rear of the vehicle body, and this flap is secured by welding to the bottom wall 63. The bottom-wall securing flap 72 is secured to the bottom wall 63 by being spot welded to the bottom wall 63 at a plurality of bottom flap joining parts 125, 125.

The internal-wall securing flap 73 protrudes from an internal end 68c (FIG. 9) of the front wall 68 along the internal wall 64 toward the rear of the vehicle body, and this flap is secured by spot welding to the internal wall 64. The external-wall securing flap 74 protrudes from an external end 68d (FIG. 9) of the front wall 68 along the external wall 65 toward the rear of the vehicle body, and this flap is secured by welding to the external wall 65. The internal front lid 67 is thereby secured by welding to the front end 61a of the internal tube

61. In this state, the front wall 68 of the internal front lid 67 is inclined from the internal wall 64 toward the external wall 65 (see FIG. 5).

Figure 9:
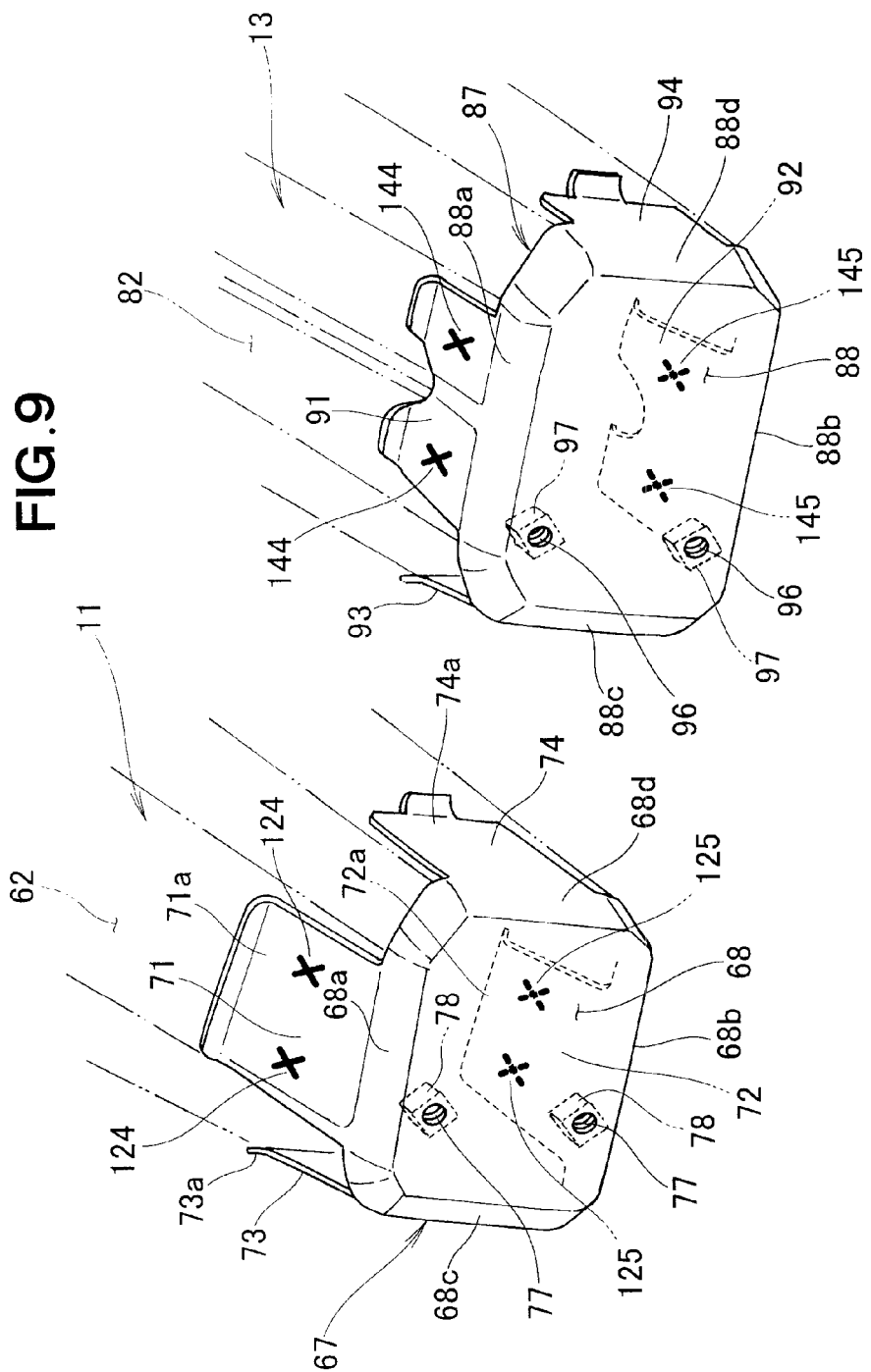
FIG. 9 is a perspective view showing on an enlarged scale an internal front lid and an external front lid of the left impact-absorbing unit of FIG. 7.

Respective flap end edges 71a, 72a, 73a, 74a of the top-wall securing flap 71, the bottom-wall securing flap 72, the internal-wall securing flap 73, and the external-wall securing flap 74 are separated from the mounting plate 35 by the same distance S2 (see FIG. 5), as shown in FIG. 9. The reasons for separating the flap end edges 71a to 74a of the securing flaps 71 to 74 by the same distance from the mounting plate 35 will be described hereinafter.

The amount by which the external extension member 42 protrudes in relation to the internal extension member 41 is minimized. The external extension member 42 has an external tube 81 formed into a substantially rectangular tube shaped from a top wall 82, a bottom wall 83, an internal wall 84, and an external wall 85 in the same manner as the internal tube 61 of the internal extension member 41, and also has an external front lid 87 for closing off the front end 81a of the external tube 81. The internal wall 84 is a wall provided facing the widthwise center of the vehicle (i.e., facing the internal extension member 41). The external wall 85 is a wall provided facing outward in the vehicle width direction.

The top wall 82 and bottom wall 83 of the external tube 81 protrude substantially horizontally toward the front of the vehicle body in a side view, and the internal wall 84 and external wall 85 protrude so as to gradually taper toward the front of the vehicle body in a plan view.

Figure 8:
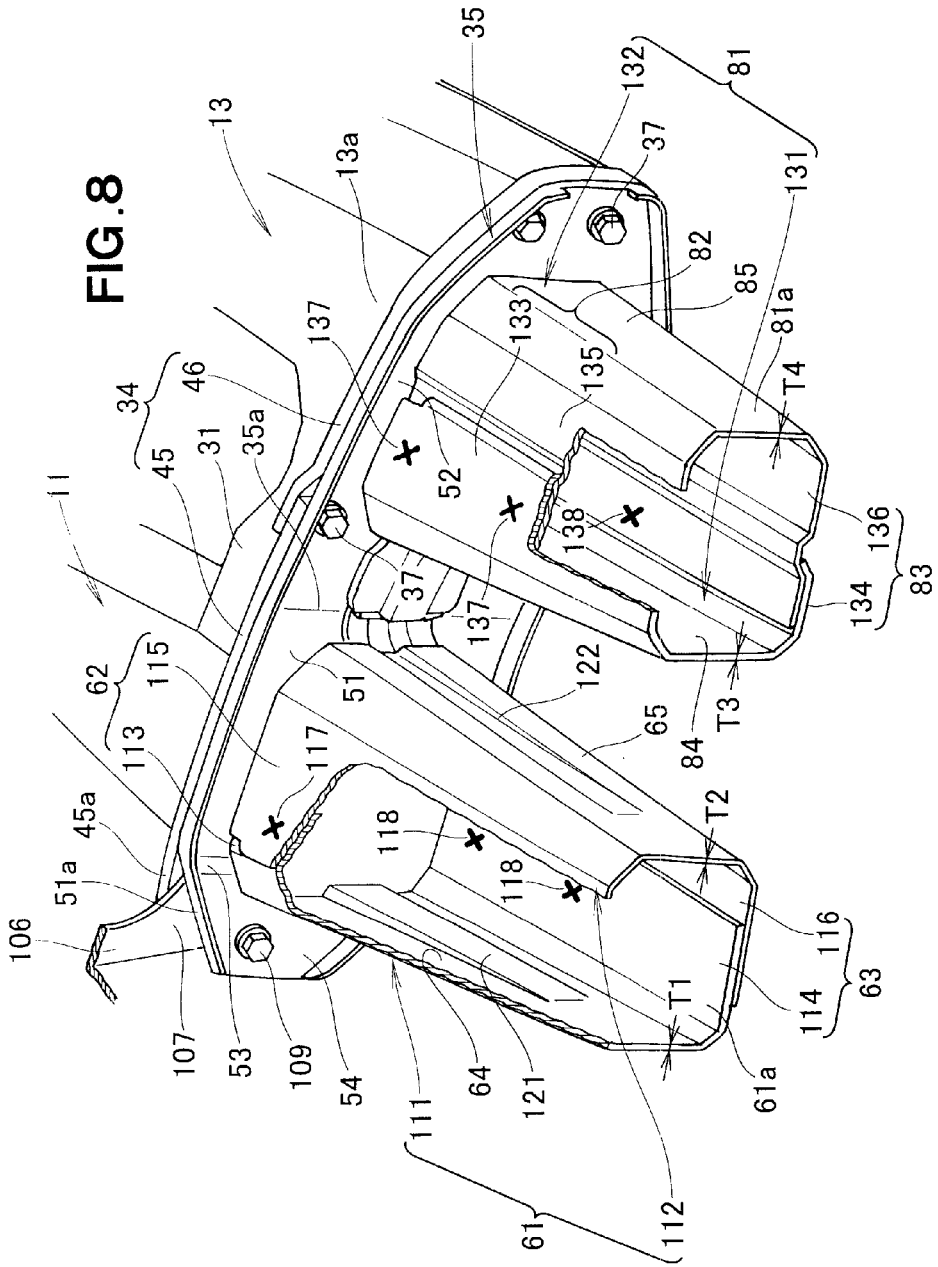
FIG. 8 is a perspective view showing an internal tube and an external tube of the left impact-absorbing unit of FIG. 7.

The external tube 81 has an internal plate 131 provided facing the widthwise center of the vehicle body, and an external plate 132 provided on the external side in the vehicle body width direction. The internal plate 131 is curved into a substantial U shape in cross section, and thereby has the internal wall 84, a top curved area 133, and a bottom curved area 134 (FIG. 8). The external plate 132 is curved into a substantial U shape in cross section, and thereby has an external wall 85, a top curved area 135, and a bottom curved area 136 (FIG. 8).

The top curved area 133 of the internal plate 131 and the top curved area 135 of the external plate 132 are superposed together, and both of the top curved areas 133, 135 are spot welded at a plurality of top joining parts 137, thereby forming the top wall 82 of the external tube 81. The bottom curved area 134 of the internal plate 131 and the bottom curved area 136 of the external plate 132 are superposed together, and both bottom curved areas 134, 136 are spot welded at a plurality of bottom joining parts 138 (only one is shown), thereby forming the bottom wall 83 of the external tube 81.

Thus, the top curved areas 133, 135 are joined together and the bottom curved areas 134, 136 are joined together, whereby the external tube 81 is formed from the internal plate 131 and the external plate 132.

The external front lid 87 has a front wall (front end of the external extension member 42) 88 for closing off the front end 81a of the external tube 81, and also has a top-wall securing flap 91, a bottom-wall securing flap 92 (FIG. 9), an internal-wall securing flap 93, and an external-wall securing flap 94, which all protrude toward the rear of the vehicle body from the front wall 88.

The top-wall securing flap 91 protrudes from a top end 88a of the front wall 88 along the top wall 82 toward the rear of the vehicle body, and this flap is secured by welding to the top wall 82. In other words, the top-wall securing flap 91 is secured to the top wall 82 by being spot welded to the top wall 82 at top flap joining parts 144, 144.

Figure 7:
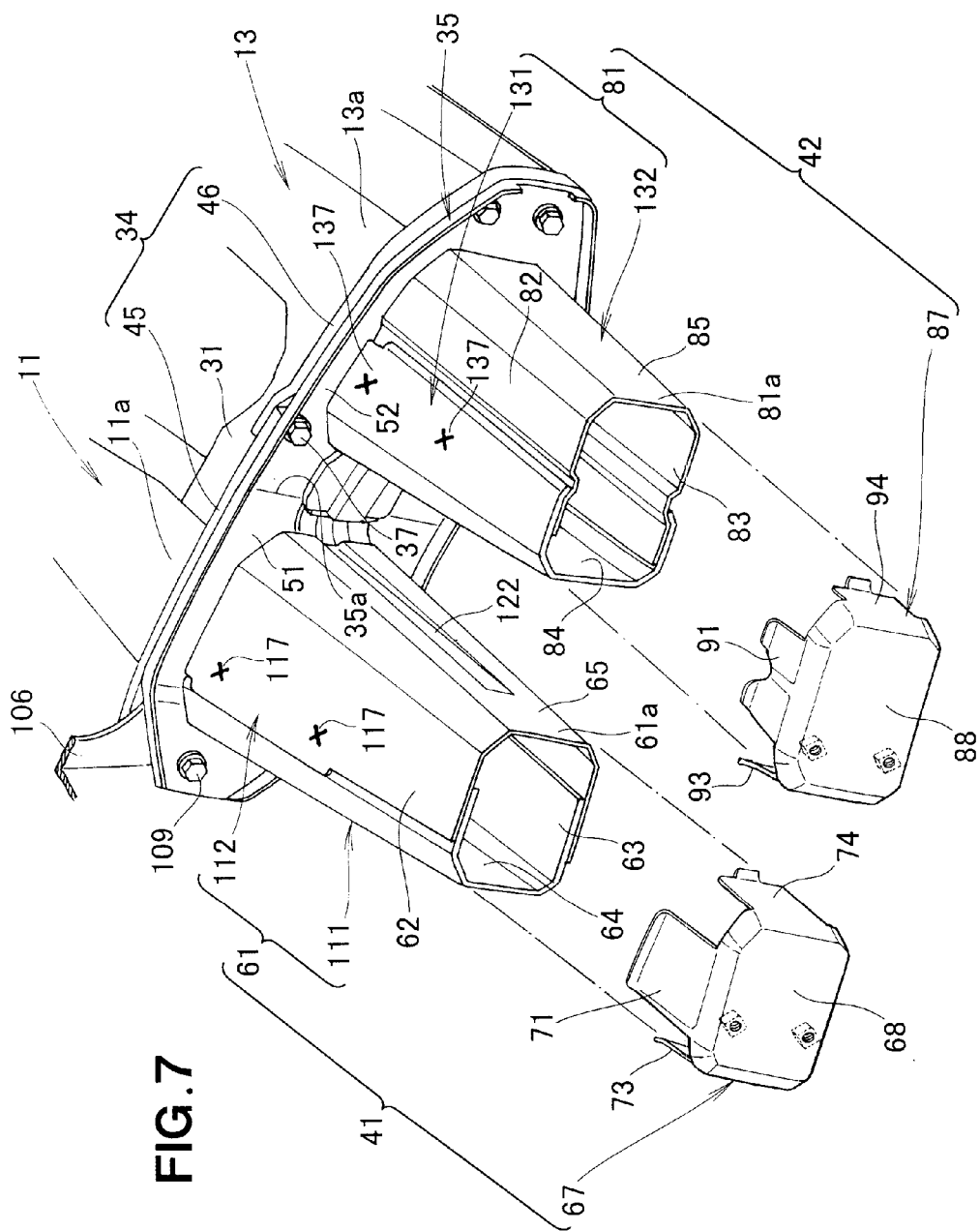
FIG. 7 is an exploded perspective view showing the left impact-absorbing unit of FIG. 6.

The bottom-wall securing flap 92 protrudes from a bottom end 88b of the front wall 88 along the bottom wall 83 toward the rear of the vehicle body, and this flap is secured by welding to the bottom wall 83 (FIG. 7). In other words, the bottom-wall securing flap 92 is secured to the bottom wall 83 by being spot welded to the bottom wall 83 at bottom flap joining parts 145, 145.

The internal-wall securing flap 93 protrudes from an internal end 88c of the front wall 88 along the internal wall 84 toward the rear of the vehicle body, and this flap is secured by welding to the internal wall 84. The external-wall securing flap 94 protrudes from an external end 88d of the front wall 88 along the external wall 85 toward the rear of the vehicle body, and this flap is secured by welding to the external wall 85. The external front lid 87 is thereby secured by welding to the front end 81a of the external tube 81.

Figure 10:
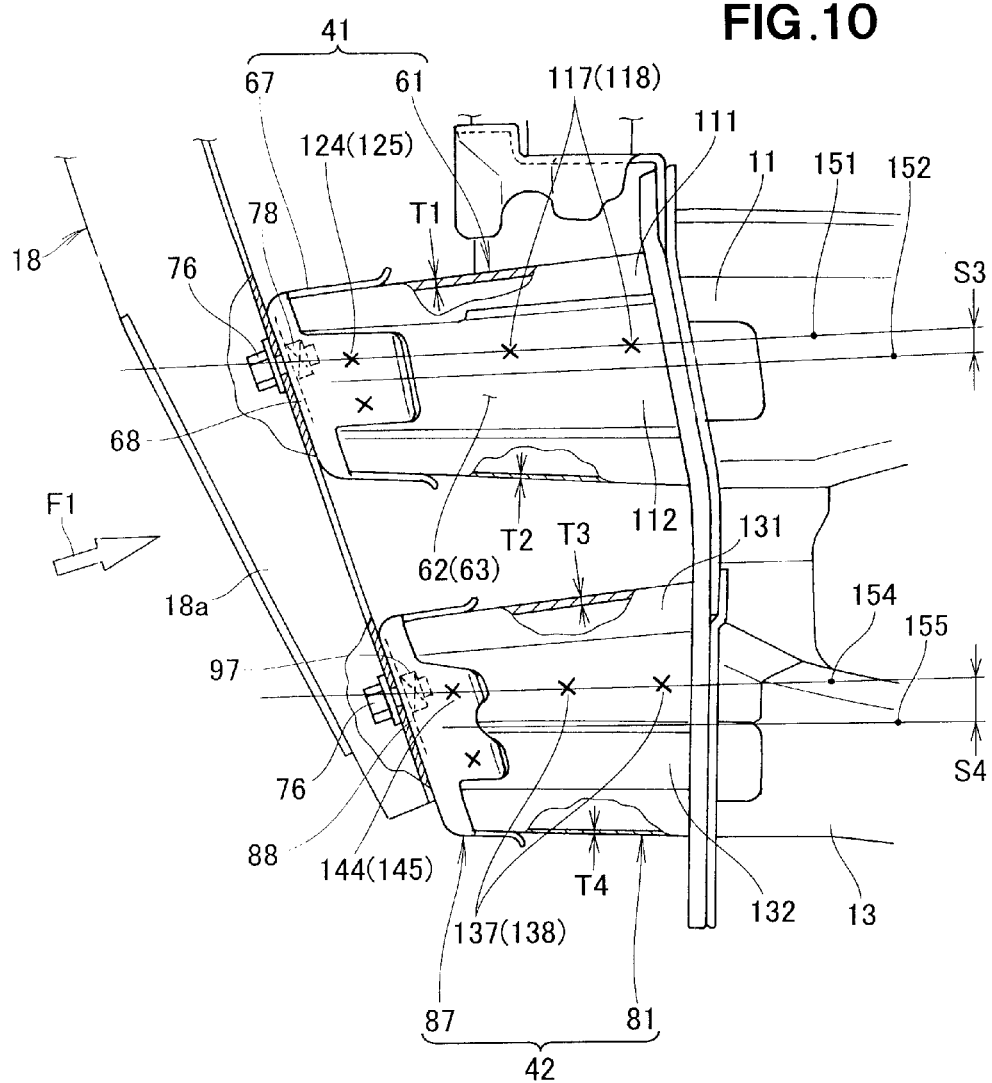
FIG. 10 is a view showing a positional relationship of a welded area and bolts of the left impact-absorbing unit of FIG. 5.

FIG. 10 shows the positional relationship between the welded areas of the left impact-absorbing unit and the bolts. In the internal extension member 41, a left end 18a of the bumper beam 18 is fastened by top and bottom bolts (fastening members) 76 to the front wall 68. The configuration whereby the left end 18a of the bumper beam 18 is fastened by the top and bottom bolts 76 to the front wall 68 of the internal extension member 41 will be described in detail hereinafter.

In the internal extension member 41, a top flap joining part 124, a bottom flap joining part 125, top joining parts 117, 117, and bottom joining parts 118, 118 are provided along an internal load transmission line 151 extending through the positions of the top and bottom bolts 76 toward the rear of the vehicle body. When an impact load F1 acts on the bumper beam 18 from in front of the vehicle body, some of the impact load F1 is transmitted through the internal load transmission line 151.

When an impact load F1 acts on the bumper beam 18 from the front of the vehicle body, some of the impact load F1 is distributed to the internal extension member 41 via the top and bottom bolts 76. The impact load distributed to the internal extension member 41 is distributed to the left front side frame 11 via the top flap joining part 124, the bottom flap joining part 125, the top joining parts 117, 117, and the bottom joining parts 118, 118 along the internal load transmission line 151.

Thus, the impact load F1 acting on the bumper beam 18 is distributed to the left front side frame 11 via the top and bottom bolts 76, the top flap joining part 124, the bottom flap joining part 125, the top joining parts 117, 117, and the bottom joining parts 118, 118 provided along the internal load transmission line 151, whereby the impact load can be efficiently distributed to the left front side frame 11.

The internal load transmission line 151 is offset by a distance S3 from the vehicle widthwise center 152 of the internal extension member 41 toward the internal plate 111 (i.e., toward the center of the vehicle in the width direction). The plate thickness T1 (see also FIG. 7) of the internal plate 111 on the side to which the internal load transmission line 151 is offset is designed to be greater than the plate thickness T2 (see also FIG. 7) of the external plate 112. Accordingly, the rigidity of the internal plate 111 is designed to be higher than the rigidity of the external plate 112. The internal extension member 41 can thereby be evenly deformed (collapsed) throughout the entire member even if an impact load is distributed unevenly to the internal plate 111. Therefore, it is possible to ensure that the internal extension member 41 will absorb a sufficient amount of the impact load.

The left front side frame 11 is designed to have higher rigidity than the left upper member 13. Accordingly, the left front side frame 11 can bear a greater impact load than the left upper member 13. In view of this, an internal plate 111 having a large plate thickness T1 is provided near the left front side frame 11, and an external plate 112 having a small plate thickness T2 is provided near the left upper member 13. A comparatively large impact load can thereby be distributed to the left front side frame 11 via the internal plate 111. A comparatively small impact load can be distributed to the left upper member 13 via the external plate 112.

Thus, a comparatively large impact load is distributed to the internal plate 111 having a large plate thickness T1, and a comparatively small impact load is distributed to the external plate 112 having a small plate thickness T2, whereby the internal extension member 41 can be evenly deformed (collapsed) throughout the entire member. It is thereby possible to ensure that the internal extension member 41 will absorb a sufficient amount of the impact load.

In the external extension member 42, the left end 18a of the bumper beam 18 is fastened to the front wall 88 by the top and bottom bolts (fastening members) 76. The configuration whereby the left end 18a of the bumper beam 18 is fastened by the top and bottom bolts 76 to the front wall 88 of the external extension member 42 will be described in detail hereinafter.

In the external extension member 42, a top flap joining part 144, a bottom flap joining part 145, top joining parts 137, 137, and bottom joining parts 138, 138 are provided along an external load transmission line 154 that extends toward the rear of the vehicle body through the positions of the top and bottom bolts 76. The external load transmission line 154 is a line through which some of the impact load F1 is transmitted when an impact load F1 acts on the bumper beam 18 from the front of the vehicle body.

When an impact load F1 acts on the bumper beam 18 from the front of the vehicle body, some of the impact load F1 is distributed to the external extension member 42 via the top and bottom bolts 76. The impact load distributed to the external extension member 42 is distributed to the left upper member 13 via the top flap joining part 144, the bottom flap joining parts 145, 145, the top joining parts 137, 137, and the bottom joining parts 138, 138 on the external load transmission line 154.

Thus, the impact load F1 acting on the bumper beam 18 is distributed to the left upper member 13 via the top and bottom bolts 76, the top flap joining part 144, the bottom flap joining parts 145, 145, the top joining parts 137, 137, and the bottom joining parts 138, 138 provided along the external load transmission line 154, whereby the impact load can be efficiently distributed to the left upper member 13.

The external load transmission line 154 is offset by a distance S4 from the vehicle widthwise center 155 of the external extension member 42 toward the internal plate 131 (i.e., toward the center of the vehicle in the width direction). The plate thickness T3 (see also FIG. 7) of the internal plate 131 on the side to which the external load transmission line 154 is offset is designed to be greater than the plate thickness T4 (see also FIG. 7) of the external plate 132. Accordingly, the rigidity of the internal plate 131 is designed to be higher than the rigidity of the external plate 132. The external extension member 42 can thereby be evenly deformed (collapsed) throughout the entire member even if an impact load is distributed unevenly to the internal plate 131. Therefore, it is possible to ensure that the external extension member 42 will absorb a sufficient amount of the impact load.

The left front side frame 11 is designed to have higher rigidity than the left upper member 13. Accordingly, the left front side frame 11 can bear a greater impact load than the left upper member 13. In view of this, an internal plate 131 having a large plate thickness T3 is provided near the left front side frame 11, and an external plate 132 having a small plate thickness T4 is provided near the left upper member 13. A comparatively large impact load can thereby be distributed to the left front side frame 11 via the internal plate 131. A comparatively small impact load can be distributed to the left upper member 13 via the external plate 132.

Thus, a comparatively large impact load is distributed to the internal plate 131 having a large plate thickness T3, and a comparatively small impact load is distributed to the external plate 132 having a small plate thickness T4, whereby the external extension member 42 can be evenly deformed (collapsed) throughout the entire member. It is thereby possible to ensure that the external extension member 42 will absorb a sufficient amount of the impact load.

Referring again to FIG. 5, in the front wall 68 of the internal front lid 67 in the internal extension member 41, the internal end 68c protrudes toward farther forward with respect to the vehicle body than the external end 68d. Accordingly, the front wall 68 of the internal front lid 67 is inclined toward the front of the vehicle body from the external end 68d of the front wall 68 toward the vehicle widthwise center up to the internal end 68c. Specifically, the front wall 68 is inclined at an inclination angle θ2 in relation to the vehicle width direction line 48.

The inclination angle θ2 is designed to be slightly greater than the inclination angle θ1 of the internal mounting part 51, in order to match the shape of the bumper beam 18. Accordingly, the front wall 68 of the internal front lid 67 is disposed substantially parallel to the internal mounting part 51.

Top and bottom mount holes 77 (see FIG. 9) through which the top and bottom bolts 76 can be inserted are formed in the front wall 68. The bolts 76 are respectively inserted through the top and bottom mount holes 77, and the inserted bolts 76 are threaded respectively into nuts 78, whereby the left end 18a of the bumper beam 18 is secured by bolting to the internal front lid 67.

As previously described, the front wall 68 is disposed substantially parallel to the internal mounting part 51 by inclining the internal mounting part 51 of the mounting plate 35 forward and setting the front wall 68 of the internal front lid 67 at an incline. By disposing the front wall 68 and the internal mounting part 51 substantially parallel to each other, the internal wall 64 and the external wall 65 of the internal extension member 41 can be made to protrude forward from the internal mounting part 51 by substantially the same amount. Accordingly, the amount of deformation (collapse) in the internal tube 61 of the internal extension member 41 can be kept uniform. The internal tube 61 of the internal extension member 41 can thereby be evenly deformed (collapsed) throughout the entire tube even when an impact load acts on the internal extension member 41. Therefore, it is possible to ensure that the internal extension member 41 will absorb a sufficient amount of the impact load.

The respective flap end edges 71a, 72a (FIG. 8), 73a, and 74a of the top-wall securing flap 71, the bottom-wall securing flap 72 (FIG. 9), the internal-wall securing flap 73, and the external-wall securing flap 74 are separated from the mounting plate 35 by the same distance S2. The reasons for separating the flap end edges 71a to 74a by the same distance S2 from the mounting plate 35 are as follows.

Specifically, in the internal extension member 41, the top-wall securing flap 71, the bottom-wall securing flap 72 (see FIG. 8), the internal-wall securing flap 73, and the external-wall securing flap 74 are superposed over the front end 61a of the internal tube 61. Therefore, the front end 61a over which the securing flaps 71 to 74 are superposed is an area comparatively resistant to deformation (collapse) under an impact load acting from the front of the vehicle body. Therefore, it is preferable that the area where the securing flaps 71 to 74 are not superposed be configured so as to deform evenly under an impact load.

In view of this, the flap end edges 71a to 74a are separated from the mounting plate 35 by the same distance S2. Accordingly, an even amount of deformation (collapse) in the internal extension member 41 can be ensured. It is thereby possible for the internal tube 61 of the internal extension member 41 to be deformed evenly throughout the entire tube, and for the impact load to be satisfactorily absorbed in cases in which an impact load acts on the internal extension member 41.

In the external extension member 42, the front wall 88 of the external front lid 87 is inclined toward the widthwise center of the vehicle and toward the front of the vehicle body from the external end 88d of the front wall 88 up to the internal end 88c. Specifically, the front wall 88 is inclined at an inclination angle θ3 in relation to the vehicle width direction line 48.

The inclination angle θ3 of the front wall 88 is designed to be substantially equal to the inclination angle θ2 of the internal front lid 67 (front wall 68) in order to match the shape of the bumper beam 18. Top and bottom mount holes 96 (FIG. 8) through which the top and bottom bolts 76 can be inserted are formed in the front wall 88.

Bolts 76 are respectively inserted through the top and bottom mount holes 96, and the inserted bolts 76 are threaded respectively into nuts 97, whereby the left end 18a of the bumper beam 18 is secured by bolting to the external front lid 87.

Referring again to FIGS. 1, 3, and 4, the front bulkhead 24 has a cooling member (radiator or the like) 26 and is disposed near the vehicle widthwise center of the mounting plate 35. Specifically, the front bulkhead 24 is disposed between the front ends 11a, 12a of the left and right front side frames 11, 12 and farther forward of the vehicle body than the front ends 11a, 12a, partitioning the front part of the engine compartment 21.

The front bulkhead 24 is formed into a substantially rectangular frame shape from an upper member 101 extending in the vehicle width direction, a lower member (not shown) provided below the upper member 101, a left stay 103 provided to the left ends of both the upper member 101 and the lower member, and a right stay 104 provided to the right ends of both the upper member 101 and the lower member.

The left stay 103 has a rear flange 106 protruding toward the mounting plate 35 in a rear part 103a. The rear flange 106 has a mounting piece 107 protruding toward the ridge 53 of the mounting plate 35, and the mounting piece 107 has a mounting hole 108.

As previously described, the mounting piece 107 is supported between the support piece 54 of the internal mounting part 51 and the internal end 45a of the internal support 45. Specifically, the mounting piece 107 is mounted by a bolt 109 in a state of being inserted between the support piece 54 of the internal mounting part 51 and the internal end 45a of the internal support 45. Accordingly, the rear flange 106 is mounted on the support plate 34 and the mounting plate 35. The left and right stays 103, 104 are bilaterally symmetrical members, and the left stay 103 is described hereinbelow, while the right stay 104 is not described.

The internal support 45 is inclined forward at an inclination angle θ1, and the internal mounting part 51 is also inclined forward at an inclination angle θ1, whereby the internal support 45 and the internal mounting part 51 can be provided farther forward with respect to the vehicle body. Accordingly, the mounting piece 107 of the rear flange 106, which is inserted between the support piece 54 of the internal mounting part 51 and the internal end 45a of the internal support 45, can be provided farther forward with respect to the vehicle body. The front bulkhead 24 can thereby be moved to a position P1 (see also FIG. 5) at the front of the vehicle body, and the cooling member 26 can be moved to the front of the vehicle body together with the front bulkhead 24. Therefore, it is possible to ensure a larger engine compartment 21 toward the front of the vehicle body, and to install a large-capacity power source 22 in the engine compartment 21 in a vehicle whose entire vehicle body length is kept compact.

The cooling member 26 can be moved farther forward with respect to the vehicle body together with the front bulkhead 24 by providing the rear flange 106 to the mounting plate 35. It is thereby possible to ensure an even larger engine compartment 21 toward the front of the vehicle body in a vehicle whose entire vehicle body length is kept compact.

The left and right front side frames 11, 12 are disposed on the left and right sides in the vehicle width direction, as shown in FIG. 1. The power source 22 is disposed in a space (engine compartment) 21 formed between the left and right front side frames 11, 12. The power source 22 is provided to the left front side frame 11 via the left mounting member 23, and is also provided to the right front side frame 12 via the right mounting member (not shown). Accordingly, the impact load distributed to one of the left and right front side frames 11, 12 (for example, the left front side frame 11) can be dispersed via the power source 22 to the right front side frame 12. The impact load distributed to the left front side frame 11 can thereby be borne more satisfactorily.

Next, an example will be described, based on FIGS. 11A to 12, of a case in which an oncoming vehicle offset-crashes into a vehicle having the vehicle body front structure 10 of the present invention.

Figure 11A:
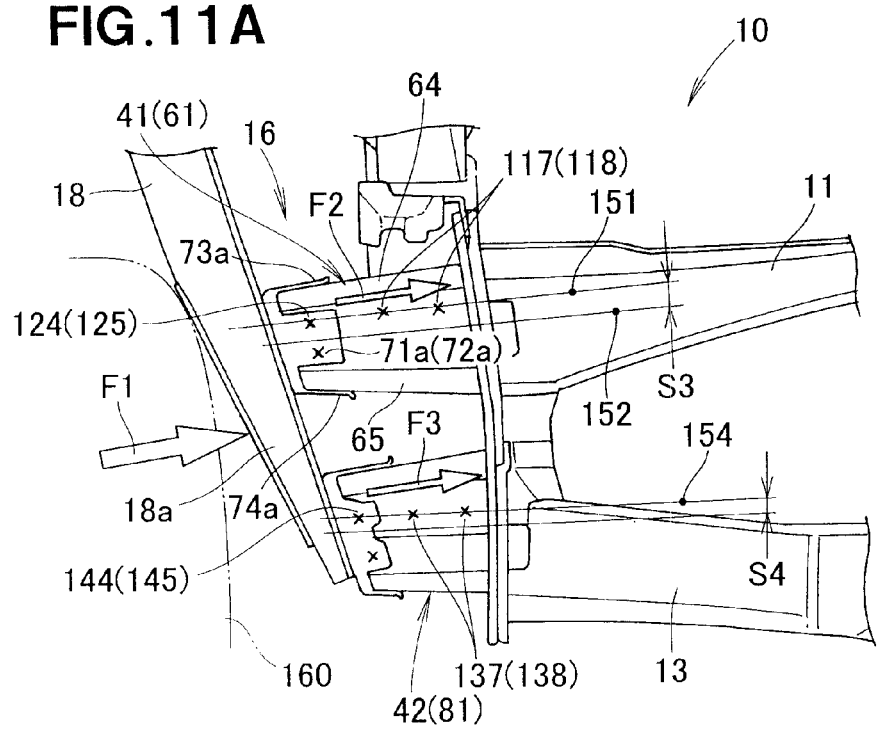
FIG. 11A is a view showing an example in which an oncoming vehicle offset-crashes into the vehicle body front structure according to the present embodiment.

In FIG. 11A, an oncoming vehicle 160 crashes into the vehicle body front structure 10 while being offset to the left. The impact load F1 resulting from the offset crash is distributed to the left impact-absorbing unit 16 via the left end 18a of the bumper beam 18. Specifically, some of the impact load F1 is distributed as an impact load F2, as shown by the arrow into the internal extension member 41. Furthermore, the rest of the impact load F1, which is an impact load F3, is distributed into the external extension member 42, as shown by the arrow.

In the internal extension member 41, the top and bottom bolts 76, the top flap joining part 124, the bottom flap joining part 125, the top joining parts 117, 117, and the bottom joining parts 118, 118 are provided along the internal load transmission line 151, as shown in FIG. 10. Accordingly, some of the impact load F1 acting on the bumper beam 18 is distributed as an impact load F2 to the internal extension member 41 via the top and bottom bolts 76, and is efficiently distributed to the left front side frame 11 via the top flap joining part 124, the bottom flap joining part 125, the top joining parts 117, 117, and the bottom joining parts 118, 118.

In the external extension member 42, the top and bottom bolts 76, the top flap joining part 144, the bottom flap joining part 145, the top joining parts 137, 137, and the bottom joining parts 138, 138 are provided along the external load transmission line 154, as shown in FIG. 10. Accordingly, the rest of the impact load F1, which is the impact load F3, is distributed to the external extension member 42 via the top and bottom bolts 76, and is efficiently distributed to the left upper member 13 via the top flap joining part 144, the bottom flap joining part 145, the top joining parts 137, 137, and the bottom joining parts 138, 138.

Figure 11B:
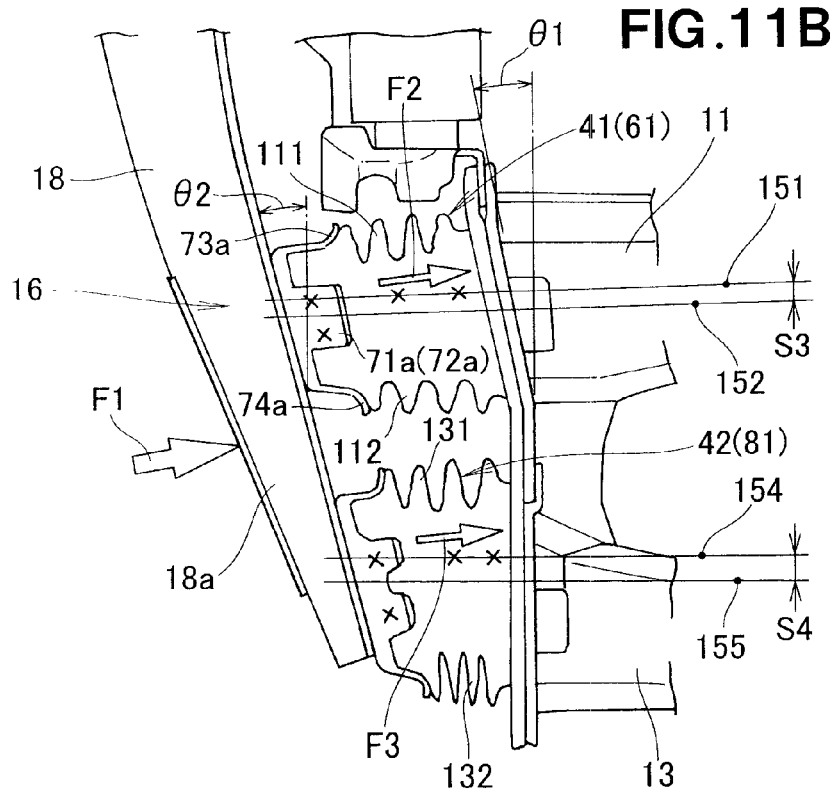
FIG. 11B is a view showing an example in which the internal and external extension members have deformed when an oncoming vehicle has offset-crashed into the vehicle body front structure of FIG. 11A.

In FIG. 11B, the impact load F2 acting on the internal extension member 41 causes the internal tube 61 of the internal extension member 41 to deform so as to collapse, and some of the impact load F2 is absorbed.

Furthermore, the impact load F3 acting on the external extension member 42 causes the external tube 81 of the external extension member 42 to deform (collapse), and some of the impact load F3 is absorbed.

As previously described, the internal support 45 is inclined forward at an inclination angle θ1, and the front wall 68 is inclined forward at an inclination angle θ2. Accordingly, the internal wall 64 (see FIG. 11A) of the internal extension member 41 and the external wall 65 (see FIG. 11A) can be made to protrude in substantially the same amount.

Furthermore, the respective flap end edges 71a, 72a, 73a, 74a of the top-wall securing flap 71, the bottom-wall securing flap 72, the internal-wall securing flap 73, and the external-wall securing flap 74 of the internal extension member 41 are separated from the mounting plate 35 by the same distance 52, as shown in FIGS. 5 and 9.

Furthermore, the inner bead 121 is extended in the internal wall 64 of the internal extension member 41 and the outer bead 122 is extended in the external wall 65 as shown in FIG. 8, whereby the rigidity of the internal wall 64 and the external wall 65 is increased in accordance with the top wall 62 and the bottom wall 63. Accordingly, an even amount of deformation in the internal tube 61 can be ensured.

The internal extension member 41 can therefore be made to deform evenly throughout the entire member when an impact load acts on the internal extension member 41. Therefore, it is possible to ensure that the internal extension member 41 will absorb a sufficient amount of the impact load.

The internal load transmission line 151 is offset from the vehicle widthwise center 152 of the internal extension member 41 toward the internal plate 111 (i.e., toward the center of the vehicle width direction) by a distance S3 (see also FIG. 11A). The internal plate 111 on the side to which the internal load transmission line 151 is offset is designed to be thicker than the external plate 112, as shown in FIG. 10. Accordingly, even if an impact load F2 is distributed unevenly to the internal plate 111, the entire internal tube 61 of the internal extension member 41 can be made to deform evenly. It is thereby possible to ensure that the internal extension member 41 will absorb a sufficient amount of the impact load F2.

The left front side frame 11 is designed to have higher rigidity than the left upper member 13. Furthermore, the internal plate 111 is designed to be thicker than the external plate 112. Accordingly, a comparatively large impact load is distributed to the internal plate 111 (the plate having the greater plate thickness) provided to the left front side frame 11.

A comparatively small impact load is distributed to the external plate 112 (the plate having the smaller plate thickness) provided to the left upper member 13. The internal extension member 41 can thereby be made to deform evenly throughout the entire member, and it is possible to ensure that the internal extension member 41 will absorb a more satisfactory amount of the impact load.

The external load transmission line 154 is offset from the vehicle widthwise center 155 of the external extension member 42 toward the internal plate 131 (i.e., toward the center in the vehicle width direction) by a distance S4 (see also FIG. 11A). The internal plate 131 on the side to which the external load transmission line 154 is offset is designed to be thicker than the external plate 132, as shown in FIG. 10. Accordingly, even if an impact load F3 is distributed unevenly to the internal plate 131, the entire external tube 81 of the external extension member 42 can be made to deform evenly. It is thereby possible to ensure that the external extension member 42 will absorb a sufficient amount of the impact load F3.

As previously described, the left front side frame 11 is designed to have higher rigidity than the left upper member 13. Furthermore, the internal plate 131 is designed to be thicker than the external plate 132. Accordingly, a comparatively large impact load is distributed to the internal plate 131 (the plate having the greater plate thickness) provided to the left front side frame 11.

A comparatively small impact load is distributed to the external plate 132 (the plate having the smaller plate thickness) provided to the left upper member 13. The external extension member 42 can thereby be made to deform evenly throughout the entire member, and it is possible to ensure that the external extension member 42 will absorb a more satisfactory amount of the impact load.

FIG. 12 shows an example in which an impact load is borne by the vehicle body front structure according to the present embodiment. After some of the impact load F2 has been absorbed by the internal extension member 41, the rest of the impact load F2, which is an impact load F4, is distributed to the left front side frame 11 as shown by the arrow. The distributed impact load F4 is borne by the left front side frame 11.

After some of the impact load F3 has been absorbed by the external extension member 42, the rest of the impact load F3 is dispersed to the left front side frame 11 and the left upper member 13, and is distributed as an impact load F5 and an impact load F6 as shown by the arrow.

The impact load F5 distributed to the left front side frame 11 is borne by the left front side frame 11. The impact load F6 distributed to the left upper member 13 is borne by the left upper member 13. The impact load F1 created when the oncoming vehicle 160 offset-crashes can thereby be satisfactorily borne by the vehicle body front structure 10.

The left and right front side frames 11, 12 are disposed to the left and right sides in the vehicle width direction, the power source 22 is disposed in the space (engine compartment) 21 formed by the left and right left and right front side frames 11, 12, and the power source 22 is provided to the left front side frame 11 via the left mounting member 23 and to the right front side frame 12 via the right mounting member (not shown), as shown in FIG. 1. Accordingly, the impact loads F4, F5 distributed to the left front side frame 11 can be dispersed as an impact load F7 to the power source 22 via the left mounting member 23. The dispersed impact load F7 is distributed to the right front side frame 12 and is borne by the right front side frame 12. It is thereby possible for the impact loads F4, F5 distributed to the left front side frame 11 to be more satisfactorily borne.

In the embodiment previously described, an example of a configuration was described in which the internal support 45 was inclined forward at an inclination angle θ1, the front wall 68 was inclined forward at an inclination angle θ2, and the internal wall 64 and external wall 65 of the internal extension member 41 were made to protrude in substantially the same amount; but the present invention is not limited to this example alone, and another option is to form the external extension member 42 in the same manner as the internal extension member 41.

In the embodiment previously described, an example was described in which the rear flange 106 of the front bulkhead 24 was supported between the support piece 54 and the internal end 45a, but the present invention is not limited to this example alone, and the rear flange 106 may be mounted with another configuration.

Furthermore, in the present embodiment, an example was described in which the internal load transmission line 151 was offset from the vehicle widthwise center of the internal extension member 41 toward the internal plate 111, but the present invention is not limited to this example alone, and it is also possible for the internal load transmission line 151 to be offset toward the external plate 112. The external extension member 42 may also be similarly offset toward the external plate 132.

Furthermore, in the present embodiment, bolts 76 were described as an example of fastening members for mounting the bumper beam 18, but the present invention is not limited to this example alone, and rivets or other fastening members can also be used.

The shapes of the left and right front side frames 11, 12, the left and right upper members 13, 14, the bumper beam 18, the front bulkhead 24, the cooling member 26, the mounting plate 35, the internal and external extension members 41, 42, the internal and external tubes 61, 81, the left and right stays 103, 104, the rear flange 106, the internal plates 111, 131, the external plates 112, 132, the top curved areas 113, 115, 133, 135, the bottom curved areas 114, 116, 134, 136, and other components presented in the present embodiment are not limited to those described in the examples and can be suitably modified.

Industrial Applicability

The present invention is suitable for application in an automobile having a vehicle body front structure in which extension members are made to protrude toward the front of the vehicle body from the front ends of front side frames.

Legend

10 . . . vehicle body front structure; 11 . . . left front side frame; 11a, 12a . . . front ends of left and right front side frames; 12 . . . right front side frame; 13 . . . left upper member; 14 . . . right upper member; 18 . . . bumper beam; 21 . . . space; 22 . . . power source; 41 . . . internal extension member; 42 . . . external extension member; 61 . . . internal tube; 62, 82 . . . top wall; 63, 83 . . . bottom wall; 64, 84 . . . internal wall; 65, 85 . . . external wall; 68 . . . front wall (front end of the internal extension member 41); 76 . . . bolt (fastening member); 81 . . . external tube; 88 . . . front wall (front end of the external extension member 42); 111, 131 . . . internal plate; 112, 132 . . . external plate; 113, 115, 133, 135 . . . top curved area; 114, 116, 134,136 . . . bottom curved area; 117, 137 . . . top joining part; 118, 138 . . . bottom joining part; 124, 144 . . . top flap joining part; 125, 145 . . . bottom flap joining part; 151 . . . internal load transmission line; 154 . . . external load transmission line; T1-T4 . . . plate thickness.

The invention claimed is:

1. A vehicle body front structure comprising:
left and right front side frames extending longitudinally of a vehicle body;
left and right upper members disposed on respective external sides of the left and right front side frames and extending in an upward slope toward a rear of the vehicle body;
mounting plates mounted on front ends of the left and right front side frames and front ends of the left and right upper members;
left and right internal extension members provided to the mounting plates near to a vehicle widthwise center; and
left and right external extension members provided to the mounting plates so as to be outside of the internal extension members,
wherein the left and right internal extension members protrude toward a front of the vehicle body from front ends of the left and right front side frames while the left and right external extension members protrude toward the front of the vehicle body from front ends of the left and right upper members,
each of the mounting plates is a single plate bent at a central portion thereof and having an internal mounting part inclined from the central portion of the mounting plate toward the front of the vehicle body and an external mounting part extending parallel to a vehicle width direction line of the vehicle body, wherein the internal mounting part corresponds in position to the front end of a corresponding one of the left and right front side frames and the external mounting part corresponds in position to the front end of a corresponding one of the left and right upper members;
the internal extension members are tubular members and each are disposed on the internal mounting part of a corresponding one of the mounting plates;
the external extension members are tubular members and are each disposed on the exterior mounting part of a corresponding one of the mounting plates; and,
each of the internal extension members includes a front lid closing a front end of the tubular member.

2. The vehicle body front structure of claim 1, further comprising a front bulkhead for supporting a cooling member, wherein the front bulkhead is disposed internally of the mounting plates near the vehicle widthwise center and has stays forming sides thereof, rear flanges are formed at rear parts of the stays so as to protrude toward the mounting plates, and the rear flanges are mounted on the mounting plates.

3. The vehicle body front structure of claim 1, wherein:
each of the internal extension members comprise a top wall, a bottom wall, an internal wall and an external wall, and front lids for closing off front ends of the tubes;
each of the front lids has a top-wall securing flap, a bottom-wall securing flap, an internal-wall securing flap and an external-wall securing flap that are capable of being welded so as to correspond respectively to the top wall, the bottom wall, the internal wall and the external wall; and
each top-wall securing flap, bottom-wall securing flap, internal-wall securing flap, and external-wall securing flap have respective flap end edges that are separated from the mounting plates by a same distance.

4. The vehicle body front structure of claim 3, further comprising a front bulkhead for supporting a cooling member, wherein the front bulkhead is disposed internally of the mounting plates near the vehicle widthwise center, and the front bulkhead is secured to the mounting plate.

5. The vehicle body front structure of claim 3, wherein:
each of the internal extension members comprise internal plates having the internal wall and top and bottom curved areas fashioned into U shapes in cross section and external plates having the external wall and top and bottom curved areas fashioned into U shapes in cross section;
the top curved areas of the internal and external plates are superposed together to form the top wall while the bottom curved areas of the internal and external plates are superposed together to form the bottom wall; and
each of the internal and the external walls have reinforcing beads formed so as to extend longitudinally of the vehicle body.

6. The vehicle body front structure of claim 1, wherein:
each of the internal extension members have internal plates having top and bottom curved areas fashioned into U shapes in cross section, and external plates having top and bottom curved areas fashioned into U shapes in cross section;

the top curved areas of the internal plates and the external plates are superposed and welded together to form top walls of the extension members;

the bottom curved areas of the internal plates and the external plates are superposed and welded together to form bottom walls of the extension members; and top joining parts on which the top curved areas are welded, bottom joining parts on which the bottom areas are welded, and fastening members for fastening the front ends of the internal extension members to the bumper beam are positioned along load transmission lines of an impact load acting from the front of the vehicle body.

7. The vehicle body front structure of claim 6, wherein the load transmission lines are offset from the vehicle widthwise centers of the extension members laterally toward one of said internal and external plates and laterally away from the other of said internal and external plates, and wherein the said one of said internal and external plates is designed to be thicker than the other of said internal and external plates.

8. The vehicle body front structure of claim 7, wherein the said one of said internal and external plates is provided near the front side frames by designing the internal plates as the one of said internal and external plates, and the other of said internal and external plates is provided near the upper members by designing the external plates as the other set of internal and external plates.

9. The vehicle body front structure of claim 1, wherein the left and right front side frames have a space for allowing placement of a power source, and the power source is provided to the left and right front side frames.

* * * * *